(12) United States Patent
Sako et al.

(10) Patent No.: US 7,433,833 B2
(45) Date of Patent: Oct. 7, 2008

(54) INFORMATION SERVICE METHOD FOR PURCHASING UTILIZING A REMOTE CONTROL

(75) Inventors: Yoichiro Sako, Tokyo (JP); Kazuko Sakurai, Tokyo (JP); Mitsuru Toriyama, Chiba (JP); Tatsuya Inokuchi, Kanagawa (JP)

(73) Assignee: Sony Corporation (JP)

( * ) Notice: Subject to any disclaimer, the term of this patent is extended or adjusted under 35 U.S.C. 154(b) by 723 days.

(21) Appl. No.: 10/009,331

(22) PCT Filed: Mar. 7, 2001

(86) PCT No.: PCT/JP01/01758

§ 371 (c)(1),
(2), (4) Date: Nov. 6, 2001

(87) PCT Pub. No.: WO01/67766

PCT Pub. Date: Sep. 13, 2001

(65) Prior Publication Data

US 2003/0101100 A1 May 29, 2003

(30) Foreign Application Priority Data

Mar. 8, 2000 (JP) .............................. P2000-068634

(51) Int. Cl.
G06Q 30/00 (2006.01)
G06F 17/30 (2006.01)
(52) U.S. Cl. .............................. 705/26; 705/27; 725/37; 725/43; 725/60
(58) Field of Classification Search ............. 705/26–27, 705/1; 706/219; 725/37, 40, 60, 43
See application file for complete search history.

(56) References Cited

U.S. PATENT DOCUMENTS

| 5,148,275 | A | * | 9/1992 | Blatter et al. ............... 348/567 |
| 5,227,874 | A | | 7/1993 | Von Kohorn |
| 5,708,845 | A | * | 1/1998 | Wistendahl et al. ...... 715/500.1 |
| 5,774,666 | A | * | 6/1998 | Portuesi ..................... 725/110 |
| 5,918,213 | A | * | 6/1999 | Bernard et al. ............... 705/26 |
| 5,929,930 | A | * | 7/1999 | Kurokawa ................... 348/568 |
| 5,931,908 | A | * | 8/1999 | Gerba et al. ................ 709/219 |
| 5,973,747 | A | | 10/1999 | Goreta |

(Continued)

FOREIGN PATENT DOCUMENTS

| JP | 7-321748 | 12/1995 |
| JP | 11-510978 A1 | 9/1999 |
| JP | 2000-69442 | 3/2000 |

OTHER PUBLICATIONS

"Viewcall Arm set-top box launched as $250 Webster is US". Computergram International. Dec. 19, 1995. (recovered from Dialog database Feb. 1, 2008.*
Gage, D., "Channeling Web TV Market,", Computer Reseller News, p. 29, Aug. 18, 1997.

Primary Examiner—Jeffrey A. Smith
Assistant Examiner—William J. Allen
(74) Attorney, Agent, or Firm—Lerner, David, Littenberg, Krumholz & Mentlik, LLP (57) ABSTRACT

Program data and information associated with at least a consumer commodity that appears in a program of the program data are synchronously transmitted. The program data and the information associated therewith are received. The received program data is reproduced. The reproduced data is displayed on a displaying portion. Information associated with a selected one of a plurality of consumer commodities displayed on the displaying portion is extracted and displayed. A viewer can buy the selected consumer commodity at a store corresponding to the extracted information.

17 Claims, 4 Drawing Sheets

U.S. PATENT DOCUMENTS

| | | |
|---|---|---|
| 6,075,527 A | 6/2000 | Ichihashi et al. |
| 6,091,823 A | 7/2000 | Hosomi et al. |
| 6,097,383 A * | 8/2000 | Gaughan et al. ............. 715/717 |
| 6,151,059 A * | 11/2000 | Schein et al. .................. 725/37 |
| 6,160,570 A * | 12/2000 | Sitnik ............................ 725/9 |
| 6,282,713 B1 | 8/2001 | Kitsukawa et al. |
| 6,304,855 B1 * | 10/2001 | Burke .......................... 705/27 |
| 6,381,583 B1 * | 4/2002 | Kenney ........................ 705/26 |
| 6,573,908 B1 * | 6/2003 | Jang ........................... 715/723 |
| 6,615,408 B1 * | 9/2003 | Kaiser et al. ................. 725/112 |
| 6,725,268 B1 | 4/2004 | Jackel et al. |
| 6,799,327 B1 | 9/2004 | Reynolds et al. |
| 7,039,935 B2 | 5/2006 | Knudson et al. |
| 7,234,155 B1 | 6/2007 | Kay et al. |
| 7,287,267 B2 | 10/2007 | Knudson et al. |
| 2004/0111332 A1 * | 6/2004 | Baar et al. .................... 705/26 |
| 2004/0139472 A1 | 7/2004 | Furet et al. |
| 2007/0006267 A1 * | 1/2007 | Walker et al. ................. 725/60 |

* cited by examiner

INFORMATION SERVICE METHOD FOR PURCHASING UTILIZING A REMOTE CONTROL

CROSS-REFERENCE TO RELATED APPLICATIONS

The present application is a national stage application under 35 U.S.C. § 371 of International Application No. PCT/JP01/01758, filed Mar. 7, 2001, which claims priority from Japanese Application No. P2000-068634, filed Mar. 8, 2000.

TECHNICAL FIELD

The present invention relates to an information service method, a data terminal unit, a data transmitting and receiving apparatus, and a data transmitting apparatus, in particular, to those that use program data.

BACKGROUND ART

A mail order sale that presents commodities to a viewer through a television broadcast and a catalogue and that he or she orders his or her desired commodity through telephone, mail, and so forth is becoming common. Such a shopping method is convenient because the viewer can check various commodities through a television broadcast and a catalogue and order the desired commodity therethrough. In recent years, network commerce and electronic commerce using networks such as Internet are increasingly used.

However, when the viewer is watching a television program, if he or she wants belongings of a guest of the television program or a piece of furniture used in the set of a drama (stage), he or she cannot obtain associated information from the television program and buy such a commodity. When the viewer wants to buy such a commodity, he or she should look for a buying method for the commodity from a company that ties up with the television program or through information from magazines and friends. Recently, a home page for a television program for example a drama has been publicized. When the viewer accesses such a home page, he or she can obtain information about the program. However, after watching the program, the viewer should access such a home page using his or her personal computer. Likewise, when the viewer wants a compact disc or the like that contains music to which he or she listens in a music program, he or she should spend time and make effort as with the case of which he or she buys a disc at a store.

Thus, an object of the present invention is to provide an information service method, a data terminal unit, a data transmitting and receiving apparatus, and a data transmitting apparatus that allow a viewer to easily obtain his or her desired commodity and music while watching a television program.

DISCLOSURE OF THE INVENTION

To solve the above-described problem, an aspect of the invention is an information service method, comprising:

synchronously transmitting program data and information associated with at least a consumer commodity that appears in a program of the program data, receiving the program data and the information associated therewith, reproducing the received program data and displaying the reproduced data on a displaying portion, and extracting information associated with one selected from a plurality of consumer commodities displayed on the displaying portion and displaying the information associated with the selected consumer commodity.

Another aspect of the invention is an information service method, comprising:

synchronously transmitting program data and information associated with at least a program of the program data, receiving the program data and the information associated therewith, reproducing the received program data and displaying the reproduced data on a displaying device, and extracting information associated with a portion that a viewer desires and selects from a program displayed on the displaying device from the information associated with the program.

Yet another aspect of the invention is a data terminal unit, comprising:

a processing portion for receiving program data and information associated therewith and reproducing the received program data, the program data being transmitted through a communication network, the information being transmitted in synchronization with the program data, a displaying portion for displaying the program data reproduced by the processing portion, and a commander operated by a viewer, wherein information associated with a portion that the viewer desires and selects from a program displayed on the displaying portion from the information associated with the program.

A further aspect of the invention is a data transmitting and receiving apparatus, comprising:

a transmitting portion for synchronously transmitting program data and information associated therewith through a communication network, a processing portion for receiving the program data and the information associated therewith that have been synchronously transmitted through the communication network and reproducing the received program data, a displaying portion for displaying the program data reproduced by the processing portion, and a commander operated by a viewer, wherein information associated with a portion that the viewer desires and selects from a program displayed on the displaying portion from the information associated with the program.

A further aspect of the invention is a data transmitting apparatus for transmitting program data and information associated therewith so that the information associated with the program data is synchronized with a picture thereof.

BEST MODES FOR CARRYING OUT THE INVENTION

Figure 1:
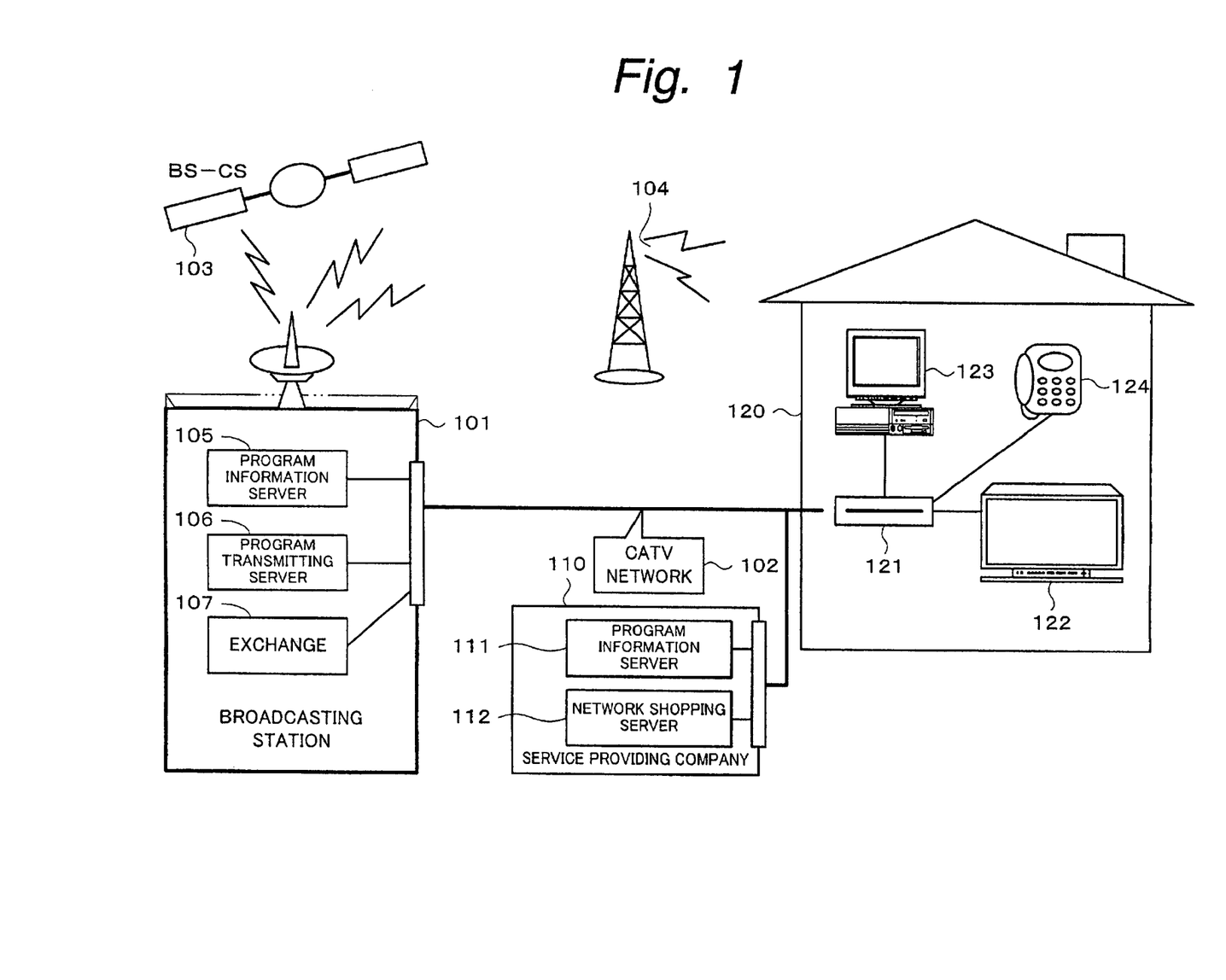
FIG. 1 is a block diagram showing the overall structure of a system according to an embodiment of the present invention.

Next, with reference to the accompanying drawings, an embodiment of the present invention will be described. FIG. 1 schematically shows the overall structure of a system according to an embodiment of the present invention. Reference numeral 101 represents a broadcasting station of for example a digital broadcast. In FIG. 1, the broadcasting station 101 distributes a program to a home 120 using a satellite 103 (for example a broadcasting satellite BS or a communication satellite CS) or a ground wave 104. A bi-directional CATV network 102 is disposed between the broadcasting station 101 and the home 120. A program is distributed to the home 120 through the CATV network 102. The broadcasting station 101 has a program information server 105, a program transmitting device 106, an exchange 107. The program information server 105 stores a program that the broadcasting station 101 broadcasts. The program transmitting device 106 transmits a program as a broadcasting signal.

Associated information is distributed to the home 120 along with program data distributed thereto through a satellite, a ground wave, a CATV, or the like. The associated information contains various types of URLs (Uniform Resource Locators), commodity information, commodity dealing stores, and so forth. A URL is a system that represents a resource on Internet. Commodity associated information is data paired with a header having an address of a bit map of a picture of a program. Music associated information contains detailed information of music of a program, information about a music obtaining method, and so forth.

As a method for distributing associated information in synchronization with program data, a packet of the associated information is multiplexed with a picture packet and an audio packet of a program. In this case, while a picture packet and an audio packet are chronologically synchronized, the associated information can be synchronized therewith. Associated information is created for each program. In addition, it is preferred to create associated information in a smaller unit than each program (namely, for each segment of a program). For example, associated information is created for each scene of a program. In the case of a drama or a movie, since each scene is known, associated information can be created corresponding to each scene. Associated information is created by the broadcasting station 101 or a production company.

A service providing company 110 is connected to the CATV network 102. The service providing company 110 has a program information server 111 and a network shopping server 112. The program information server 111 and the network shopping server 112 allow a television shopping and an online shopping to be accomplished through the CATV. When the CATV network 102 is of bi-directional type, the viewers can perform an online shopping through the CATV network 102. Alternatively, the service providing company 110 is connected to the home 120 through another bi-directional network such as a telephone line so as to allow an online shopping to be accomplished for the viewers through the network.

In addition, the service providing company 110 has a function for providing associated information in a non-broadcasting period corresponding to a command that the viewer issues while he or she is watching a program. When the viewer designates a picture of a commodity while watching a program, the designated information is stored. When the viewer requests associated information corresponding to the designated information through the CATV network 102 or the other bi-directional network, the service providing company 110 provides the associated information to the viewer through the CATV network 102 or the other bi-directional network.

A transmitting and receiving terminal unit 121 is disposed in the home 120. The transmitting and receiving terminal unit 121 is connected to the CATV network 102, a receiving device (that includes an antenna that receives a satellite broadcast), a receiving device (that includes an antenna that receives a ground wave broadcast), a telephone line, and so forth. A television monitor 122, a personal computer 123, and a telephone set 124 are connected to the transmitting and receiving terminal unit 121. The television monitor 122 displays received programs of a CATV broadcast, a satellite broadcast, a ground wave broadcast, and so forth on its screen.

According to the embodiment, when a viewer who is watching a program on the monitor 122 is interested in a commodity, a place, music, or the like that appears on the program, he or she can designate it so that associated information thereabout is presented. With the presented associated information, the viewer can buy the designated commodity or obtain information about the buying method therefor.

Figure 2:
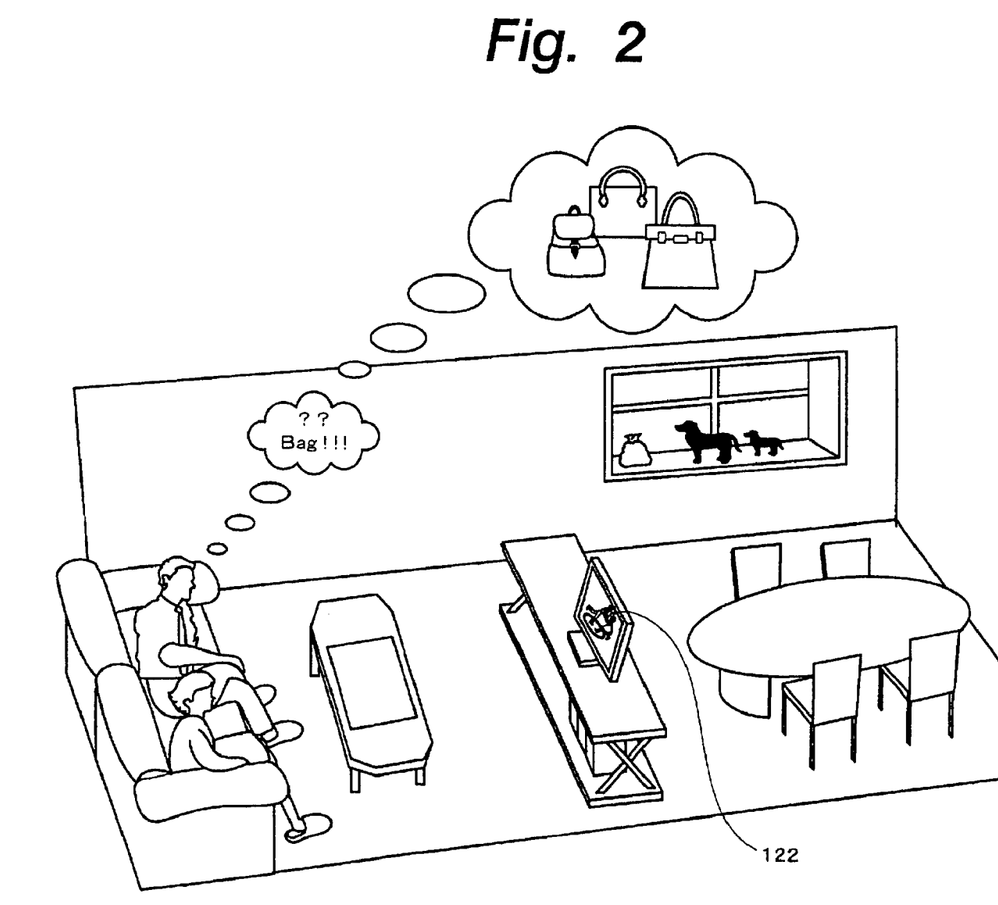
FIG. 2 is a schematic diagram for explaining the embodiment of the present invention.

FIG. 2 shows the state that a viewer is watching a program on the television monitor 122. In the state, the viewer is interested in a handbag that a guest of the program has and he or she wants to buy the handbag if possible. According to the embodiment of the present invention, information about the handbag can be provided to the viewer.

Figure 3:
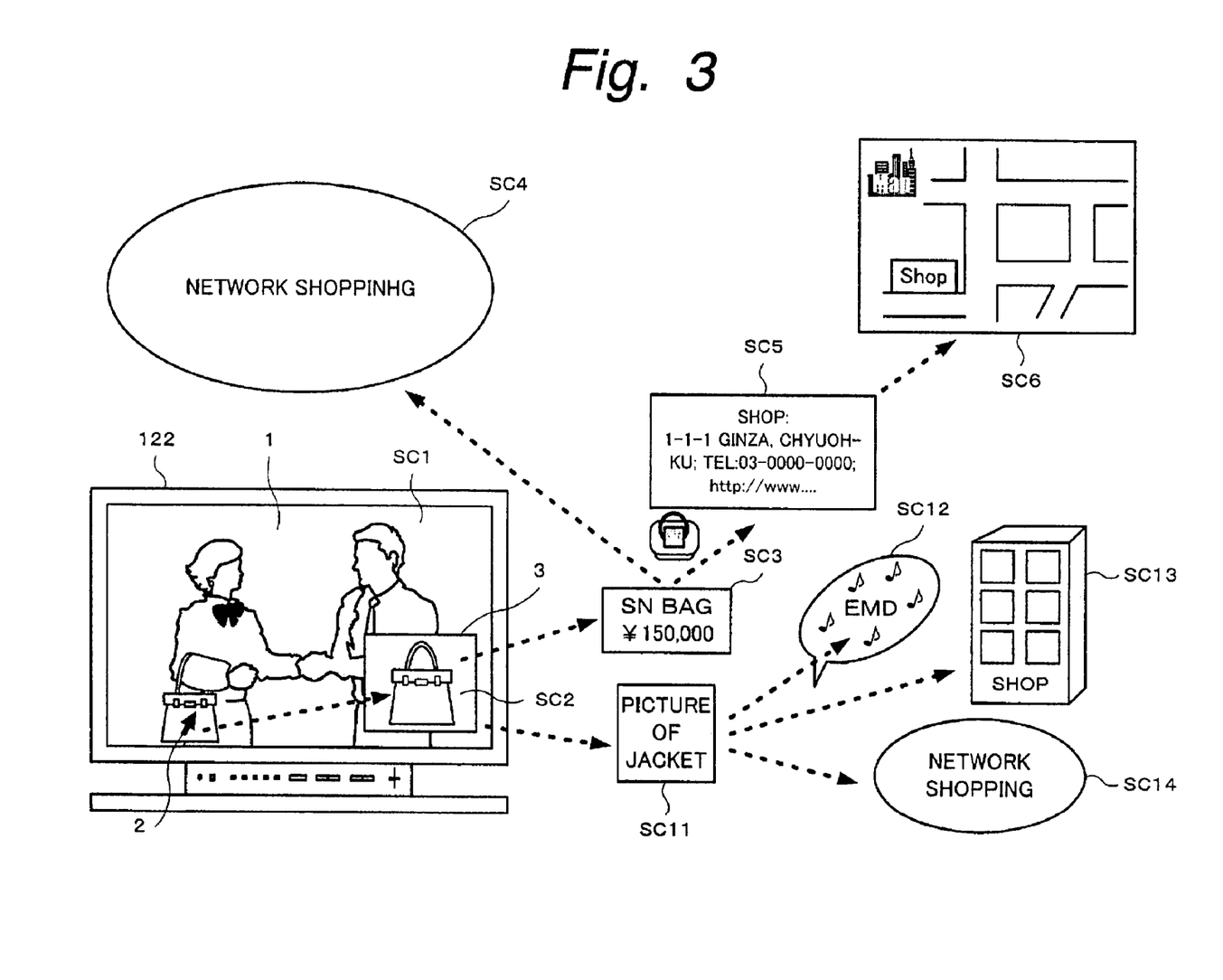
FIG. 3 is a schematic diagram for explaining several real examples of associated information according to the embodiment of the present invention.

FIG. 3 shows a process performed in such a case. When a viewer wants to buy a consumer commodity such as a handbag that a guest of a program has in a particular scene SC1 of a drama on a screen 1 of the television monitor 122, he or she performs an operation for designating the display position of the handbag with a remote control commander 21. For example, the viewer operates the remote control commander 21 and places a cursor 2 on the handbag on the screen 1 of the monitor 122.

Figure 4:
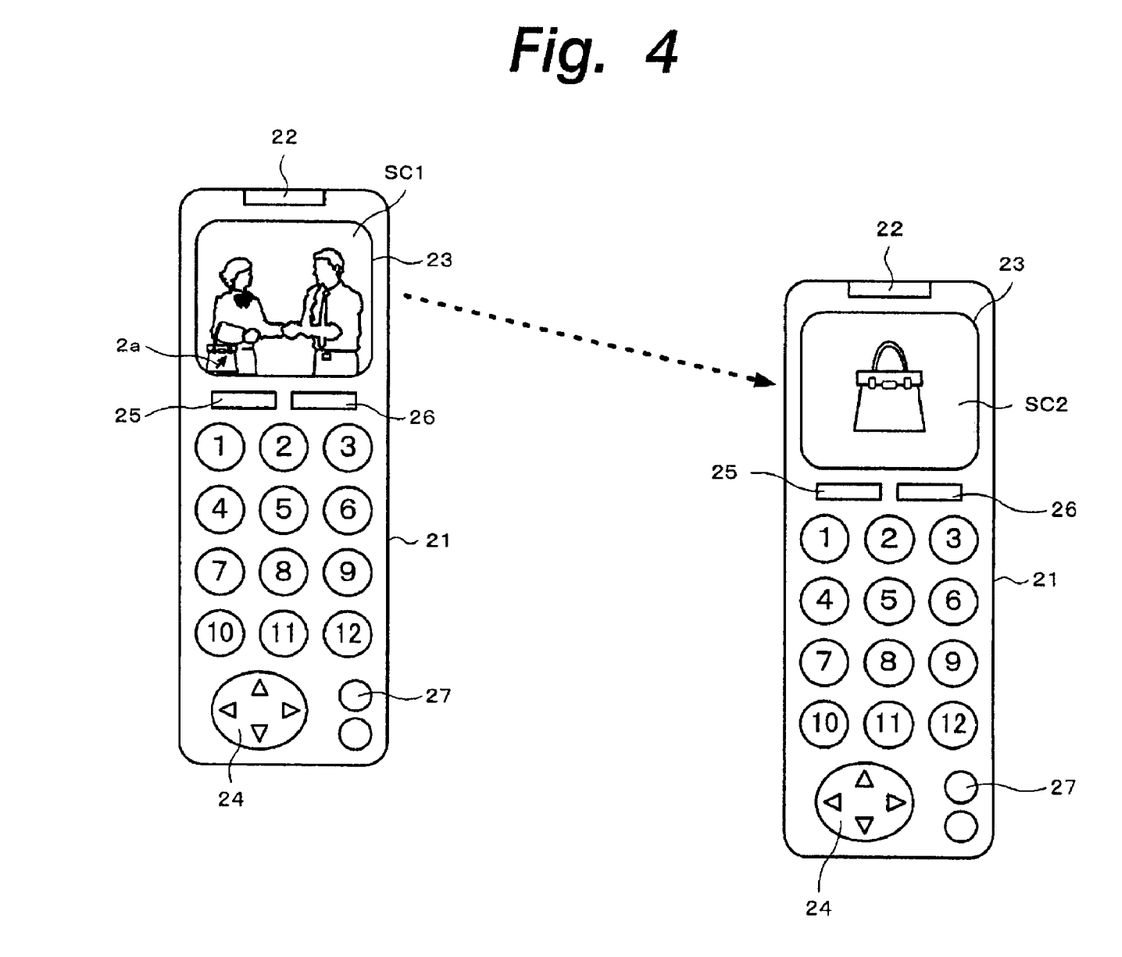
FIG. 4 is a schematic diagram for explaining a remote control commander according to the embodiment of the present invention.

FIG. 4 shows an example of the commander 21. A wireless bi-directional communication path for example Bluetooth or IrDA is connected between the commander 21 and the transmitting and receiving terminal unit 121 to which the television monitor 122 is connected. Reference numeral 22 is a transmitting and receiving portion of wireless communication system. Bluetooth is a wireless communication system whose maximum data transmission speed is 1 Mbits/sec and that uses a 2.4 GHz band. IrDA is a wireless communication system whose maximum data transmission speed is 1 Mbits/sec and that uses an infrared ray. An interface that complies with one of such wireless communication systems may be disposed in the commander 21 or built in a memory card that can be attached and detached to/from the commander 21.

The remote control commander 21 has a displaying portion 23 such as a liquid crystal display. The same picture (for example, the scene SC1 of the drama) as that displayed on the television monitor 122 is displayed on the screen of the displaying portion 23. With a direction key (also referred to as cross key) 24 as a pointing device of the commander 21, the position of the cursor 2 is moved on the screen 1 of the monitor 122 so that the cursor 2 is placed on a desired consumer commodity for example a handbag. The cursor 2 may be always displayed on the screen of the television monitor 122. In the example, when the direction key 24 is operated, the cursor 2 appears on the screen of the monitor 122. Alternatively, on the screen of the displaying portion 23 of the commander 21, a cursor 2a may appear. While the viewer is watching the screen of the displaying portion 23, he or she may operate the direction key 24 so that the cursor 2a is placed on the handbag.

According to the embodiment, a viewer can designate a desired one from commodities that appear on at least one of the screen 1 of the monitor 122 and the screen of the displaying portion 23 of the commander 21. In addition, as the pointing device, instead of the direction key 24 that moves the cursor, another structure can be used. For example, the screen of the displaying portion 23 of the commander 21 or the screen of that displaying device other than the television monitor 122 may be a touch panel. In this case, the viewer can designate his or her desired commodity by touching it on the screen. In addition, a cellular phone that has a transmitting and receiving module that communicates with the transmitting and receiving terminal unit 121 may be used as an indoor remote control commander.

In such a manner, the viewer designates his or her desired commodity (in the above-described example, a handbag) in the scene SCI of a program that is being broadcast and presses the center portion of the direction key 24 as a clicking operation. The viewer may designate his or her desired commodity with a confirmation key other than the direction key 24. When the viewer presses the center portion of the direction key 24, the commodity selecting operation performed by the viewer is completed. To acknowledge the selecting operation performed by the viewer, a lamp (for example, a light emitting diode) 25 lights. Reference numeral 26 is a lamp that indicates that the power of the commander 21 is turned on/off so as to notify the user (namely, the viewer) that the power of the remote control commander 21 is turned on/off.

The transmitting and receiving terminal unit 121 receives a control signal that is generated corresponding to an operation of the commander 21 and moves the cursor 2 on the screen 1 of the monitor 122. The clicking operation of which the center portion of the direction key 24 is pressed allows information (address of the bit map) at the designated position to be obtained.

As was described above, associated information that synchronizes with program data and that corresponds to positions on the screen is distributed along with the program data. Thus, when the transmitting and receiving terminal unit 121 obtains position information that the viewer has designated with the commander 21 (the position information is for example an address on the bit map), the transmitting and receiving terminal unit 121 extracts designated position information from the associated information that synchronizes with the screen and presents the extracted associated information to the viewer. As shown in FIG. 3, an associated information window SC2 is displayed on a child screen 3 of the screen 1 by a superimposing method and presented to the viewer. In the case shown in FIG. 3, a handbag designated by the viewer is displayed as an enlarged picture on the child screen. When the viewer selects and designates a large commodity, the picture thereof may be displayed as a reduced picture on the child screen 3. As shown in FIG. 4, the associated information window SC2 is displayed on the displaying portion 23. It is not necessary to display associated information on both the screen of the television monitor 122 and the screen of the commander 21. Instead, associated information about a consumer commodity selected and designated by the viewer can be displayed on at least one of the screen of the television monitor 122 and the screen of the commander 21.

Next, with reference to FIG. 3, an example of associated information will be described. While the associated information window SC2 is displayed on the child screen 3 of the television monitor 122, when a viewer presses a predetermined button (for example, the direction key 24) of the commander 21, a window SC3 that shows the brand name of the manufacturer or seller, the product name, the model name, and the price of the handbag corresponding to the associated information window SC2 is displayed on the child screen 3. When the viewer wants to buy the handbag as a commodity displayed as the window SC3 on the child screen 3, he or she operates a predetermined key, button, or the like of the commander 21 so as to perform a predetermined buying operation for the handbag corresponding to a predetermined method defined in a network shopping SC4.

When the viewer wants to directly buy a commodity displayed as the window SC2 on the child screen 3 of the television monitor 122 at a store, he or she operates a predetermined key, button, or the like of the commander 21 so as to display a window SC5 that shows the address and URL of the store that sells the handbag displayed on the child screen 3. In such a case, when the viewer operates a predetermined key, button, or the like of the commander 21, a window SC6 that shows a map of the store that sells the handbag is generated and displayed on the monitor 122 or the displaying portion 23 of the commander 21. With information that the window SC5 or SC6 shows, the viewer can go to the store and buy the desired commodity (in this example, a handbag) at the store.

In the above-described example, a case of which a viewer obtains or buys a commodity that appears in a program was described. However, the present invention can be also applied for a case of which a viewer obtains information about a hotel, a restaurant, an amusement park, or the like that appears in a program or that is used in a location of a movie. In other words, when a viewer wants to go to a hotel or the like that appears in a program, he or she can perform the same operation as the commodity buying operation. As a result, for example, the viewer can electronically know the accommodation fee of the hotel and obtain the map thereof, and reserve a room thereof.

In addition, in a program that is broadcast, music is often used. A viewer may want to know detailed information of music used in the program or obtain the music. In the case of music, unlike with a case of which a viewer buys a commodity, he or she does not need to designate it using position information on the screen. Thus, according to the embodiment, a music get button 27 is disposed on the commander 21. When the viewer presses the music get button 27, he or she can obtain music that is used in the program.

As shown in FIG. 3, when the viewer presses the music get button 27, a jacket picture SC11 of a medium (for example, a CD (compact disc)) that contains music is displayed on the child screen 3 of the television monitor 122. When the viewer wants to buy the music, he or she operates a predetermined button or key so as to select one of several obtaining methods.

As one of such methods, music is obtained with a window SC12 of EMD (Electronic Music Distribution). The window SC12 displayed on the child screen 3 shows an EMD access method, EMD music identifiers, and so forth. Corresponding to the window SC12, the viewer can operate the personal computer 123 connected to the transmitting and receiving terminal unit 121 so as to download music used in the program to a hard disk of the personal computer 123 through a network service such as EMD.

As another music obtaining method, the viewer can operate the commander 21 so as to obtain information of a store that sells a medium (for example, a compact disc) that contains music used in the program with a store window SC13. With the store window SC13, the viewer can go to the store and buy the compact disc at the store. The store information contains the address of the store and so forth. In addition, with the network shopping SC14, the viewer can buy his or her desired music (namely, a medium that contains the music used in the program).

In addition, to reduce the workload of a program producer, associated information may be only URLs of home pages. When a viewer performs a clicking operation on a predetermined screen, the URL and information that designates the program (broadcast channel and click time information) are stored in a memory of the transmitting and receiving terminal unit 121. Alternatively, when the viewer places the cursor at the display position of his or her desired commodity displayed on a predetermined screen and performs the clicking operation at the position, information that designates the position on the screen is generated and stored.

After watching a program, a viewer can browse stored designated information through the transmitting and receiving terminal unit 121 or a home page for the program through the personal computer 123 to which designated information has been loaded. The home page for the program provides information about commodities that appear in the program and music used therein. The home page is directly linked to the network shopping. In this case, the network shopping includes what the service providing company 110 shown in FIG. 1 provides. Since time information of the designated information represents a screen on which the viewer has performed the clicking operation, a commodity, music, and so forth that the viewer wants can be obtained. The network shopping provides detailed information (price, order method, and so forth) about commodities, music, and so forth.

The present invention is not limited to the above-described embodiment. In other words, without departing from the scope of the present invention, various modifications and applications are available. For example, when a program is recorded to a storage medium such as a VTR, a hard disk, or an optical disc, associated information can be recorded so that it synchronizes with the program.

According to the present invention, while a viewer is watching a television program, he or she can obtain information about his or her desired commodity or music with a simple operation. In the case of a commodity, when the viewer designates a picture showing the commodity, he or she can obtain information necessary to buy the commodity. In addition, the commodity is displayed as an enlarged picture on a child screen or a displaying portion of a remote control commander. Thus, the viewer can check the commodity. In the case of music, a jacket picture of the designated music is displayed. Thus, the viewer can easily check information associated with music. As a result, depending on how much associated information is associated with program information, the contents of the provided service are determined. When various types of associated information are associated with programs, although the amount of information that the viewer can obtain increases, it becomes difficult to create the associated information and distribute it along with programs. While the viewer is watching a program, if only designated information is generated, he or she can watch the program without an interruption. In this case, after watching the program, the viewer can deliberately consider buying a commodity or music.

The invention claimed is:

1. An information service method, comprising:
  receiving broadcast program data and information associated with a plurality of consumer commodities that appear in a broadcast program formed of the broadcast program data, the broadcast program having a predefined order, the information associated with the plurality of consumer commodities being synchronously transmitted with the broadcast program data;
  reproducing the broadcast program in its predefined order from the received broadcast program data;
  displaying the reproduced broadcast program on a display portion of a remote control;
  selecting one of the plurality of consumer commodities by placing a cursor on that commodity using the remote control while that commodity appears in the displayed broadcast program;
  extracting the information associated with the selected one of the plurality of consumer commodities from the information associated with the plurality of consumer commodities;
  displaying at least a portion of the information associated with the selected one of the plurality of consumer commodities on a child screen superimposed on the reproduced broadcast program; and
  storing information about the selected one of the plurality of consumer commodities while the reproduced broadcast program is being displayed so that the stored information about the selected one of the plurality of consumer commodities is accessible after the reproduced broadcast program is displayed.

2. The information service method as set forth in claim 1, wherein said method is a method for buying the selected one of the plurality of consumer commodities.

3. The information service method as set forth in claim 1, wherein an image representing the selected one of the plurality of consumer commodities is displayed on the child screen of the displaying portion.

4. The information service method as set forth in claim 3, wherein the display of the image representing the selected one of the plurality of consumer commodities may be switched with a display of the information associated with the selected one of the plurality of consumer commodities on the child screen.

5. The information service method as set forth in claim 1, wherein the information associated with the selected one of the plurality of consumer commodities includes information selected from the group consisting of information about a price of the selected one of the plurality of consumer commodities, and information about a name that distinguishes the selected one of the plurality of consumer commodities.

6. The information service method as set forth in claim 1, wherein the information associated with the selected one of the plurality of consumer commodities includes information about a store from which the selected one of the plurality of consumer commodities can be bought.

7. The information service method as set forth in claim 1, wherein the information associated with the selected one of the plurality of consumer commodities includes information regarding how the selected one of the plurality of consumer commodities is purchased through a network.

8. The information service method as set forth in claim 1, wherein the broadcast program data and the information associated with the plurality of consumer commodities are received through a bi-directional communication network.

9. The information service method as set forth in claim 1, wherein the information associated with the selected one of the plurality of consumer commodities is paired with bit map addresses of a display screen of the broadcast program.

10. The information service method as set forth in claim 1, wherein the transmission of the information associated with the selected one of the plurality of consumer commodities is synchronized with an image from the broadcast program.

11. The information service method as set forth in claim 1, further comprising:
  transmitting the stored information about the selected one of the plurality of consumer commodities to an external apparatus, and receiving further information associated with the stored information about the selected one of the plurality of consumer commodities from the external apparatus.

12. The information service method as set forth in claim 1, further comprising: referring to the stored information about the selected one of the plurality of consumer commodities to access further information associated with the stored information about the selected one of the plurality of consumer commodities.

13. The information service method as set forth in claim 1, wherein the broadcast program is selected from the group consisting of a broadcast dramatic program and a broadcast movie.

14. The information service method as set forth in claim 1, wherein a given portion of the information associated with at least one of the plurality of consumer commodities is further associated with a particular scene of the broadcast program.

15. The information service method as set forth in claim 1, wherein the cursor appears on the display portion of the remote control but does not appear on the display.

16. The information service method as set forth in claim 1, further comprising:

displaying the at least portion of the information associated with the selected one of the plurality of consumer commodities on the display portion of the remote control after said extracting step is carried out.

17. The information service method as set forth in claim 16, wherein the at least portion of the information associated with the selected one of the plurality of consumer commodities is displayed on the display portion instead of the superimposed child screen.

\* \* \* \* \*